Dec. 25, 1962     P. HAWTIN     3,069,775
DENTAL APPARATUS
Filed June 23, 1960
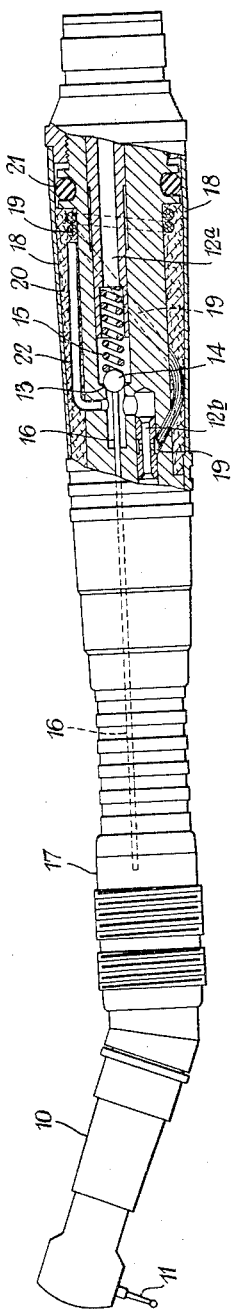

United States Patent Office 3,069,775
Patented Dec. 25, 1962

3,069,775
DENTAL APPARATUS
Percy Hawtin, Blackpool, England, assignor to Percy Hawtin, Blackpool, England, and Ashley Bending Company Limited, Bankfield, England, a company of Great Britain
Filed June 23, 1960, Ser. No. 38,175
Claims priority, application Great Britain Nov. 18, 1959
4 Claims. (Cl. 32—27)

This invention relates to dental apparatus and is in particular concerned with turbine driven dental handpieces.

A particular feature of such turbine driven dental handpieces is the very high speed at which they can operate. Thus hitherto proposed turbine driven dental handpieces have been designed to drive a dental drill at a rate of 250,000 r.p.m. or more. It will be appreciated that with an operating speed of this order it is essential that an effective lubrication of all moving parts should be maintained during operation of the engine.

In an attempt to provide such effective lubrication hitherto proposed high speed turbine driven handpieces have been provided with means in the form of foot-operated control equipment, which equipment is coupled on the one hand to the hand-piece itself, and on the other hand to a source of fluid under pressure such as an air compressor. In addition to being used to control the supply of compressed fluid to drive the turbine, the control equipment is also used to feed a spray of lubricating medium into the stream of compressed fluid flowing to the handpiece thus lubricating medium being utilized for lubricating the moving parts.

It is an object of the present invention to provide in or for use in a turbine driven dental handpiece, means for insuring effective lubrication of the moving parts.

According to the present invention there is associated with a turbine driven dental handpiece a lubricant reservoir having a wick element adapted to lead therefrom and into a duct through which compressed fluid is caused to flow for the purpose of driving said turbine. Preferably, the portion of the wick element housed in the reservoir will be surrounded by a mass of lubricant absorbent material such as cotton wool.

In further accordance with the invention in a turbine driven dental handpiece including at least one turbine supported on a handpiece having a main duct therein through which compressed fluid may be supplied to said turbine there is provided a valve operable to control the flow of fluid through said main duct and a lubricant reservoir from a wick element extends into said duct, the arrangement being such that, upon operation of the valve to allow flow of fluid through the duct, lubricant will pass into the fluid stream and commingle therewith.

In order that the said invention may be clearly understood and readily carried into effect the same will be hereinafter more fully described with reference to the accompanying drawing which shows partially in section a dental handpiece incorporating lubricant supply means.

Referring to the drawing it will be seen that the handpiece is fitted at one end with a detachable angled head 10 which houses a small turbine and is adapted to support a dental burr or other similar item of equipment indicated at 11. An air duct formed in the adjustable head communicates at one end with the chamber which houses the turbine and at the other with a main air supply duct extending axially of the handpiece. That end of the handpiece remote from the head 10 is adapted to be attached to a flexible tube through which compressed air may be fed from a source of compressed air, such as an air compressor, through the main air duct to the turbine. Provision will of course be made for escape of exhaust air from the turbine preferably through a further axial bore in the handpiece but since that feature forms no part of the present invention and since the handpiece as so far generally described is known, further reference to that and other standard features of construction will not be made herein.

In the embodiment illustrated the main air duct through the handpiece is designated in the form of sections 12a and 12b, the part 12a being provided with a constriction adapted to provide a seating 13 for a ball valve 14. The ball 14, which is biassed against the seating 13 by a spring 15, is rigidly attached to a rod 16 extended through an axially extending bore in the body of the handpiece. The end of the rod 16 which is remote from the ball 14 is coupled to a collar 17 which is capable of limited backward and forward movement axially of the handpiece, the arrangement being such that a slight rearward movement of the collar 17 in a direction away from the head 11 will result in displacement of the ball 14 from its seating 13 against the action of the spring 15 with the result that air will flow through the main duct and thence to the head 11. The collar 17 which can be operated by a slight movement of the finger tip of the operator holding the handpiece constitutes a finger tip control means, actuation of which opens or closes the ball valve controlling the flow of compressed air to the turbine.

As will be seen the handpiece is so constructed as to incorporate a space or reservoir 18 adapted to contain a supply of lubricant. Disposed within the reservoir 18 is a wick element 19 which is led therefrom via an appropriate bore in the body or core of the handpiece to the portion 12b of the air duct. Preferably as indicated the major portion of the wick element 19 which is disposed within the reservoir 18 will be surrounded by a mass 20 of lubricant absorbent material such as cotton wool. Provision will be made for introducing lubricant to the reservoir 18 when it is required to replenish the supply in the latter. The opposite ends of the lubricant reservoir will be appropriately sealed to prevent undesired escape of lubricant therefrom and one of such sealing means is indicated at 21.

In operation when the reservoir 18 is supplied with lubricant, lubricant will, as a result of capillary forces, be led to the tip of the wick element 19 which projects into the main air duct 12b. When, as a result of displacement of the ball 14 from its seating 13, compressed air is allowed to flow through the main air duct, lubricant will be caused to pass from the wick element 19 into the air stream in the form of a fine spray.

22 denotes a duct which leads from the main air duct and into a reservoir 18, such duct 22 being effective in insuring that a rapid equalization of pressure is attained between the reservoir 18 and the main air duct. It is also believed that the provision of the duct 22 improves the capillary action whereby lubricant is led from the reservoir and along the wick element to the tip of the latter.

While in the construction above described and illustrated the lubricant reservoir is actually incorporated in the handpiece it may be feasible to provide a separate lubricant container which is adapted to be secured to the handpiece such container being adapted to house a wick element which is led therefrom via a suitable tube or conduit communicating with the main air duct leading through the handpiece. As before the tip of the wick element will project into the main air duct and similarly a second connection will be provided between said main air duct and the container to allow for pressure equalization between the latter and said duct. In the case where a separate reservoir is employed it may be desirable instead of mounting it on the handpiece to connect it to any appropriate point of the compressed air line leading to the handpiece. For example, it may be connected at or in the region of the control equipment referred to above in connection with previously proposed high speed turbine driven handpieces.

It will be seen that the provision of lubricating means in accordance with the invention provides an effective and economical means for lubricating the moving parts of a dental handpiece turbine. Again in the case of the particular embodiment illustrated there will no longer be any necessity for an elaborate and expensive control unit, since the control of the drill or burr and the lubrication are effected simultaneously by a minimal movement of the finger tip of the operator.

Finally it may be mentioned here that while the handpiece has been specifically described as operated by compressed air it will be readily appreciated that such a turbine driven dental handpiece may equally well be operated by other forms of compressed fluid.

I claim:

1. A dental device including a pressure fluid driven element, a handpiece supporting said element and provided with first and second duct sections constituting a duct adapted for the supply of said pressure fluid to said element and wherein said first section is upstream of said second section relative to the flow of pressure fluid through said duct, valve means between said duct sections for selectively connecting the same, means defining a lubricant reservoir associated with said handpiece and opening into said second section, and means coupling said second duct section to said reservoir at a position in the latter spaced from said second duct section so that pressure fluid drives lubricant from said reservoir into said second duct section.

2. A dental device comprising a pressure fluid driven drill, a handpiece supporting said drill and provided with first and second duct sections constituting a duct adapted for the supply of said pressure fluid and wherein said first section is upstream of said second section relative to the flow of pressure fluid through said duct, valve means extending between said duct sections for selectively connecting the same, means defining a lubricant reservoir associated with said handpiece and opening into said second section, a wick on said reservoir extending toward said second section, and conduit means coupling said second duct section to said reservoir at a position in the latter spaced from the opening of said reservoir into said second section whereby pressure fluid is enabled to drive lubricant from said reservoir into said second duct section.

3. In a dental device including a pressure fluid driven drill, a handpiece provided with first and second duct sections offset from each other, said duct sections being adapted for the supply of said pressure fluid and constituting a duct wherein said first section is upstream of said second section relative to flow of pressure fluid through said duct, valve means extending between said duct sections for selectively connecting the same, said valve means including a valve seat, a valve member adapted for homing in said seat to isolate said duct sections, and a spring urging said valve member toward said seat, a rod displaceably extending through said handpiece and engaged with said valve member, a collar externally encircling said handpiece and connected to said rod and being effective through the latter to displace said valve member away from said seat, means defining a lubricant reservoir associated with said handpiece and having an opening at said second section, a wick on said reservoir extending into said opening, and conduit means coupling said second duct section to said reservoir at a position in the latter spaced from said opening whereby pressure fluid is enabled to drive lubricant from said reservoir via said opening into said second duct section for lubricating said drill.

4. In a dental device including a pressure fluid driven drill, an elongated handpiece provided with first and second longitudinally extending duct sections offset from each other in parallel arrangement, said duct sections being adapted for the supply of said pressure fluid and constituting a duct wherein said first section is upstream of said second section relative to flow of pressure fluid through said duct, valve means extending between said duct sections for selectively connecting the same, said valve means including a valve seat, a ball adapted for homing in said seat to isolate said duct sections, and a spring urging said ball toward said seat, a rod displaceably extending through said handpiece and engaged with said ball, a collar externally encircling said handpiece and connected to said rod and being effective through the latter to displace said ball away from said seat, means defining a lubricant reservoir associated with said handpiece and having an opening at said second section, a wick on said reservoir extending into said opening, and conduit means coupling said second duct section to said reservoir at a position in the latter spaced from said opening whereby pressure fluid is enabled to drive lubricant from said reservoir via said opening into said second duct section for lubricating said drill.

References Cited in the file of this patent
UNITED STATES PATENTS

| | | |
|---|---|---|
| 2,090,885 | Clark | Aug. 24, 1937 |
| 2,180,993 | Monnier | Nov. 21, 1939 |
| 2,921,372 | Bodine | Jan. 19, 1960 |
| 2,977,682 | Flatray | Apr. 4, 1961 |